US012312088B2

(12) United States Patent
Senechal et al.

(10) Patent No.: US 12,312,088 B2
(45) Date of Patent: May 27, 2025

(54) PASSENGER SEATING ARRANGEMENT

(71) Applicant: Adient Aerospace, LLC, Bothell, WA (US)

(72) Inventors: Gary Lee Senechal, Lake Stevens, WA (US); William Trystan Parry, Bellevue, WA (US)

(73) Assignee: Adient Aerospace, LLC, Bothell, WA (US)

( * ) Notice: Subject to any disclaimer, the term of this patent is extended or adjusted under 35 U.S.C. 154(b) by 0 days.

(21) Appl. No.: 18/310,150

(22) Filed: May 1, 2023

(65) Prior Publication Data

US 2023/0331387 A1 Oct. 19, 2023

Related U.S. Application Data

(63) Continuation of application No. 17/119,593, filed on Dec. 11, 2020, now Pat. No. 11,673,671.
(Continued)

(51) Int. Cl.
*B64D 11/06* (2006.01)

(52) U.S. Cl.
CPC ...... *B64D 11/0602* (2014.12); *B64D 11/0606* (2014.12); *B64D 11/0627* (2014.12); *B64D 11/0646* (2014.12)

(58) Field of Classification Search
CPC ............ B64D 11/0602; B64D 11/0605; B64D 11/0606; B64D 11/0627; B64D 11/0636;
(Continued)

(56) References Cited

U.S. PATENT DOCUMENTS

| 6,264,273 B1 * | 7/2001 | Waters, Sr. ........ B64D 11/0689 297/188.21 |
| 7,011,273 B1 | 3/2006 | Stanford |

(Continued)

FOREIGN PATENT DOCUMENTS

| DE | 102008028275 A1 | 12/2009 | |
| DE | 102009009692 | * 8/2010 | ............... B60R 7/04 |

(Continued)

OTHER PUBLICATIONS

Douglass-Jaimes, David. "The Living's 3D Printed Airplane Partition is Designed to Mimic Bone Structure." Arch Daily, Jan. 20, 2016, www.archdaily.com/780661/the-livings-parametric-3d-printed-airplane-partition-is-designed-to-mimic-bone-structure. (Year: 2016).*
(Continued)

*Primary Examiner* — Michael C Zarroli
*Assistant Examiner* — Ka Chun Leung
(74) *Attorney, Agent, or Firm* — Yee & Associates, P.C.

(57) ABSTRACT

A passenger furniture device for a passenger seat provided within a vehicle cabin, in particular an aircraft cabin, including at least a base element comprising at least an upper utility surface for a passenger, a removable section element which is mounted to one side of the base element, and a simple latch mechanism. In particular, the latch mechanism may be a simple plug-in and clip device. The latch mechanism is an easy-to-handle releasable attachment and fixation device to release the removable section from the base element, particularly only by crew and service members of the aircraft. The latch mechanism is provided on the base element and the section element such that the section element is detachably mounted to the base element via the latch mechanism.

20 Claims, 10 Drawing Sheets

Related U.S. Application Data (60) Provisional application No. 62/946,644, filed on Dec. 11, 2019.

(58) Field of Classification Search
CPC ............ B64D 11/0638; B64D 11/0646; B64D 11/003
See application file for complete search history.

(56) References Cited

U.S. PATENT DOCUMENTS

| | | | |
|---|---|---|---|
| 9,718,388 B1* | 8/2017 | Cressy | B60N 3/08 |
| 2001/0030436 A1 | 10/2001 | Kifer et al. | |
| 2003/0122392 A1* | 7/2003 | Larsen | B60N 2/793 |
| | | | 296/37.8 |
| 2006/0091169 A1* | 5/2006 | Lippert | B60R 7/043 |
| | | | 224/42.32 |
| 2007/0046058 A1 | 3/2007 | Busha et al. | |
| 2008/0004846 A1 | 2/2008 | Singh et al. | |
| 2010/0314521 A1 | 12/2010 | Pauken et al. | |
| 2013/0241247 A1 | 9/2013 | Wallace | |
| 2015/0115104 A1* | 4/2015 | Perkins | B64C 1/18 |
| | | | 244/119 |
| 2015/0130244 A1 | 5/2015 | Wyss | |
| 2016/0332731 A1 | 11/2016 | Suzuki | |
| 2016/0332734 A1* | 11/2016 | Goode | B64D 11/06395 |
| 2017/0001727 A1* | 1/2017 | Schuler | B64D 11/06 |
| 2017/0283066 A1* | 10/2017 | Heidtmann | B64D 11/0636 |
| 2019/0300177 A1 | 10/2019 | Nicholas | |
| 2020/0108935 A1* | 4/2020 | Schuttera | B64D 11/0648 |
| 2021/0017927 A1 | 6/2021 | Senechal et al. | |

FOREIGN PATENT DOCUMENTS

| | | | | |
|---|---|---|---|---|
| EP | 2556993 | A1 | 2/2013 | |
| EP | 3095701 | A1 | 11/2016 | |
| EP | 3546357 | * | 10/2019 | ............. B64D 11/06 |
| FR | 2906773 | | 4/2008 | |
| GB | 2572446 | A | 10/2019 | |
| GB | 2586027 | A | 2/2021 | |
| JP | H08-244535 | A | 9/1996 | |
| JP | 2000-142588 | A | 5/2000 | |
| JP | 2008-174231 | A | 7/2008 | |
| JP | 5507570 | B2 | 5/2014 | |
| JP | 2014-532581 | A | 12/2014 | |
| WO | 2006054064 | A1 | 5/2006 | |
| WO | WO 2014/149349 | * | 12/2014 | ............... G09B 9/00 |
| WO | 2019179637 | A1 | 9/2019 | |
| WO | WO2020/091885 | * | 5/2020 | ............... B64C 1/14 |

OTHER PUBLICATIONS

EP 20213311.2—Extended European Search Report, mailed Apr. 28, 2021, 7 pages.
"First Office Action Issued in Japanese Patent Application No. 2020-205777," Mailed Oct. 28, 2021, 17 pages.
First Office Action for Japanse Patent Application No. 2022-102579, dated Jun. 27, 2023.

* cited by examiner

PASSENGER SEATING ARRANGEMENT

CROSS REFERENCE TO RELATED APPLICATIONS

This application is a Continuation of U.S. application Ser. No. 17/119,593 filed on Dec. 11, 2020, which claims priority to U.S. Provisional Patent Application No. 62/946,644 filed Dec. 11, 2019, the entire disclosures of which are hereby incorporated by reference herein.

BACKGROUND OF THE INVENTION

Field of the Invention

The present invention relates to Passenger furniture devices for passenger seats are provided within a vehicle cabin to improve privacy and comfort for passengers. Passenger furniture devices may be one of a passenger console or the like providing utility surfaces such as table surfaces or storage surfaces to a passenger of the seat.

Description of the Background Art

For example, common business class seat units in aircraft often include a passenger seat adjustable between a seating position and a bed position, and a console element arranged adjacent the seat. The console element provides a footwell for a passenger seated behind and a utility or table surface for the passenger of the corresponding seat.

However, typical seat units have limited accessibility for passengers with limited mobility, e.g. with a disability.

SUMMARY OF THE INVENTION

The disclosed examples are described in detail below with reference to the accompanying drawing figures listed below. The following summary is provided to illustrate examples or implementations disclosed herein. It is not meant, however, to limit all examples to any particular configuration or sequence of operations.

In an implementation, provided herein is a passenger furniture device for a passenger seat provided within a vehicle cabin, in particular an aircraft cabin, comprising at least a base element comprising at least an upper utility surface for a passenger, a removable section element which is mounted to one side of the base element, and a simple latch mechanism. In particular, the latch mechanism may be a simple plug-in and clip device. The latch mechanism is an easy-to-handle releasable attachment and fixation device to release the removable section from the base element, particularly only by crew and service members of the aircraft. The latch mechanism is provided on the base element and the section element such that the section element is detachably mounted to the base element via the latch mechanism.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about." Similarly, the term, "plurality," as used herein may also be referred to as a list, collection, or ensemble.

Examples herein provide an improved passenger furniture device for a passenger seat such that use of the passenger furniture device 1 for a passenger 30 is maintained whilst allowing an easy transformation of the passenger furniture device 1 such that the passenger seat 10*b* is accessible for a passenger 30 with disability, such as reduced mobility. Further, an improved seat unit 10 and passengers seating arrangement 100 for a vehicle cabin 20 are provided.

Figure 1A:
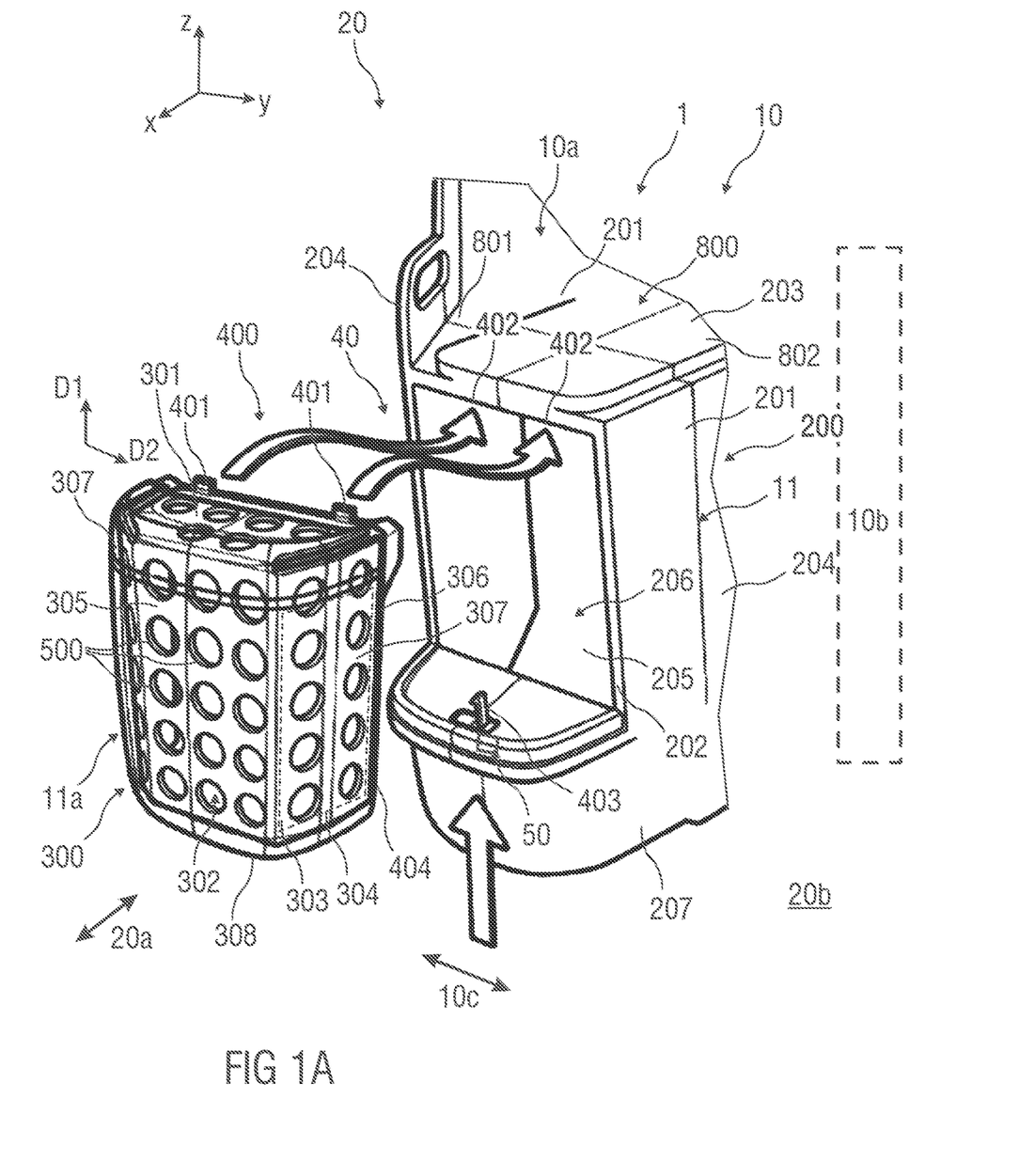
FIGS. 1A to 1C show schematically in perspective views embodiments of a passenger furniture device, in particular a passenger console.
Figure 1B:
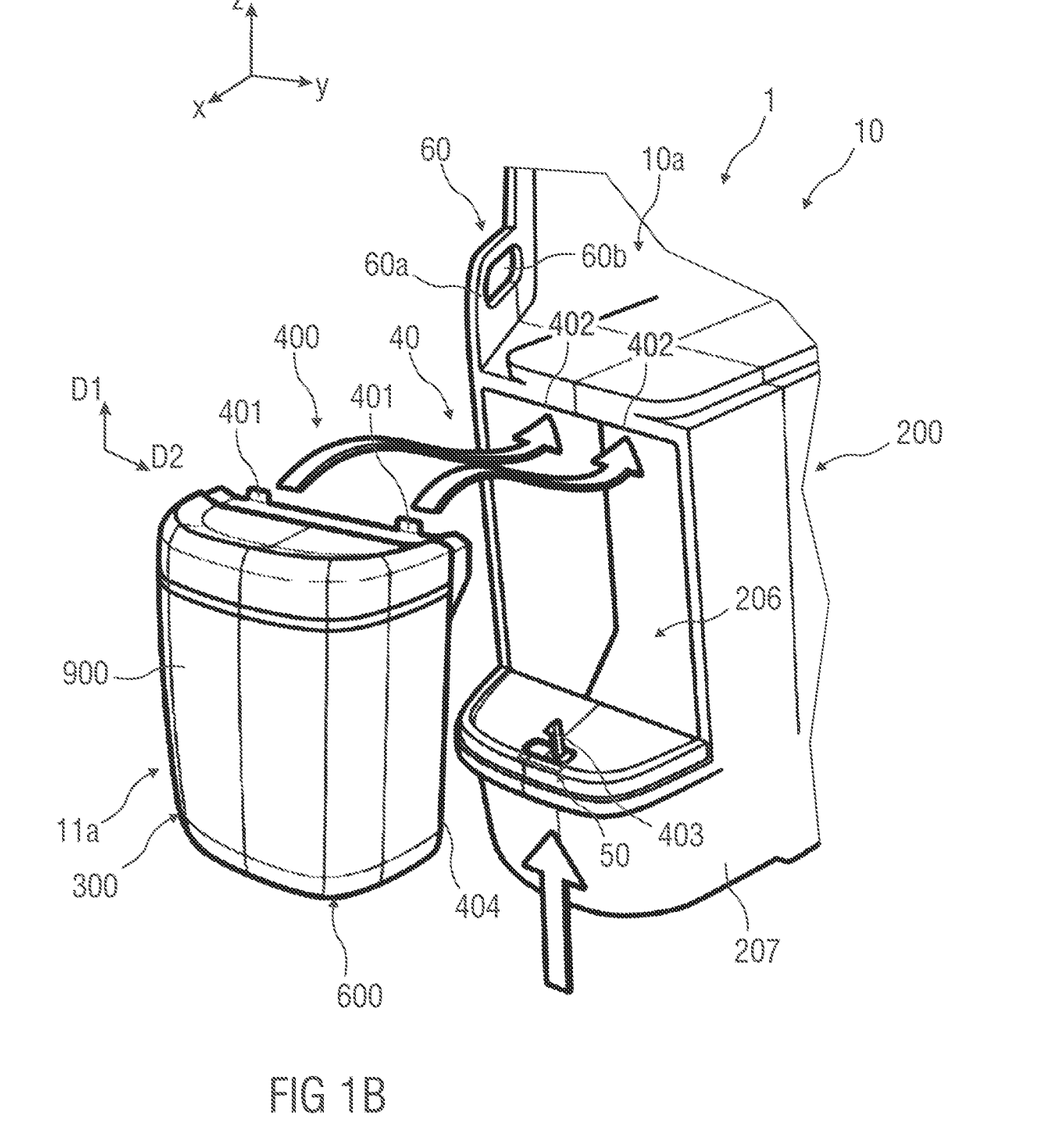
Figure 1C:
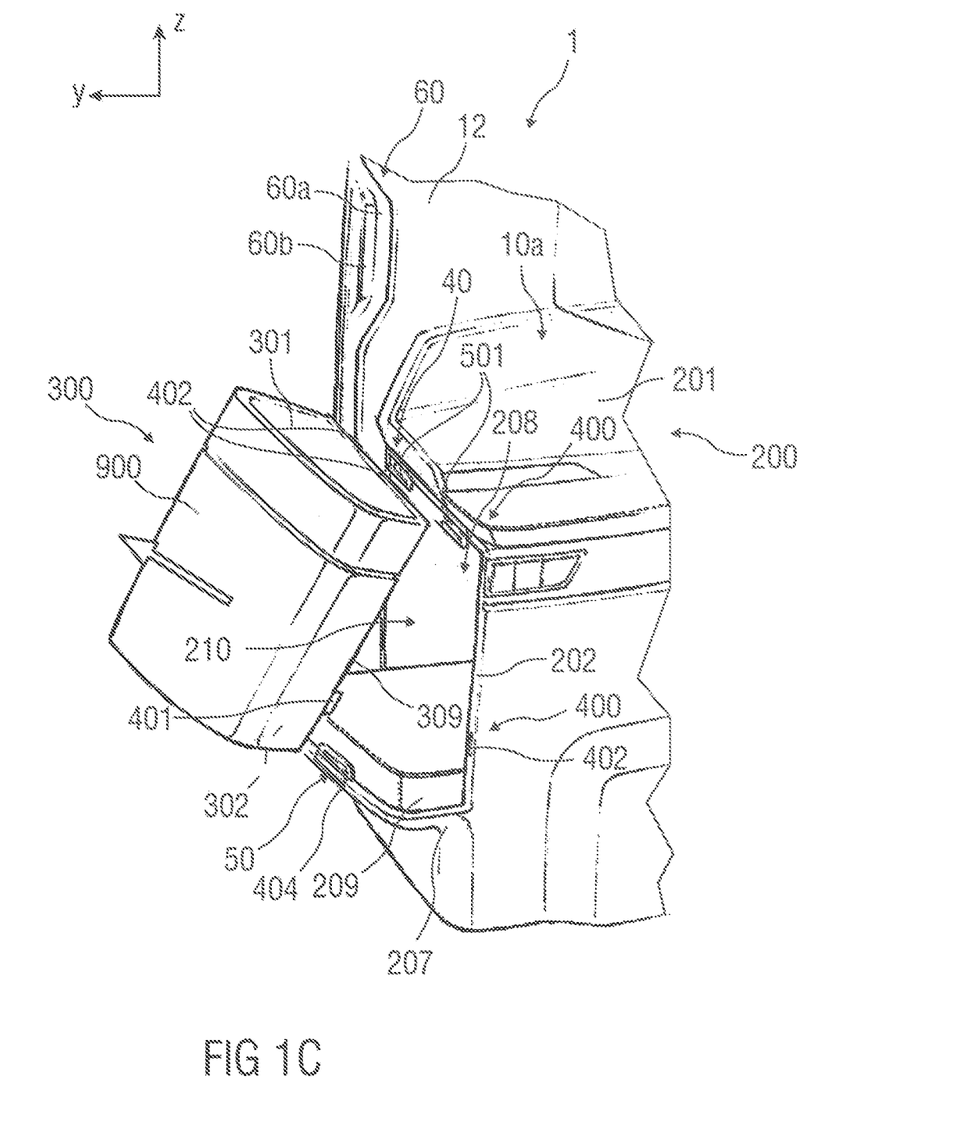
Figure 5:
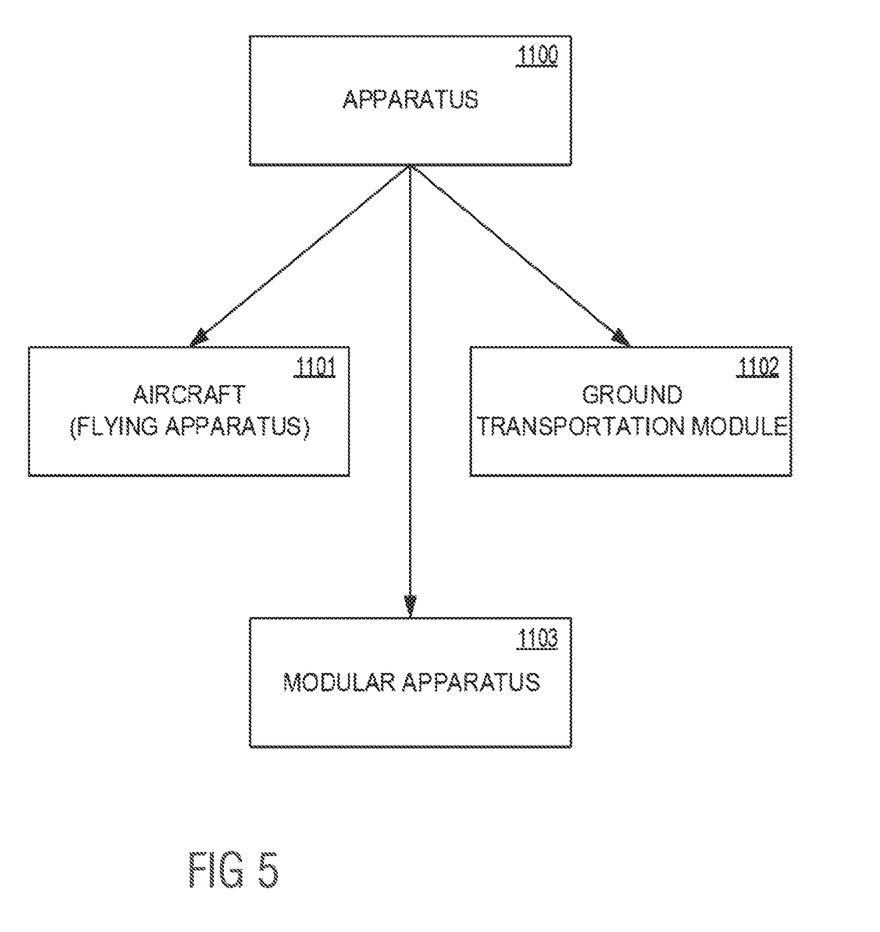
FIG. 5 is a block diagram of an apparatus for which various aspects of the disclosure can be employed in accordance with an example.

FIGS. 1A to 1C show schematically in perspective views embodiments of a seat unit 10 arranged within a vehicle cabin 20 of an apparatus 1100 as shown in FIG. 5. In the illustrated examples, the vehicle cabin 20 is an aircraft cabin. For example, the aircraft cabin may be an interior 1206 shown in FIG. 6. However, any other passenger transportation vehicle or cabin is contemplated. The seat unit 10 comprises a passenger furniture device 1, in particular a passenger console 10*a*. Further, the seat unit 10 comprises a passenger seat 10*b*.

Figure 4A:
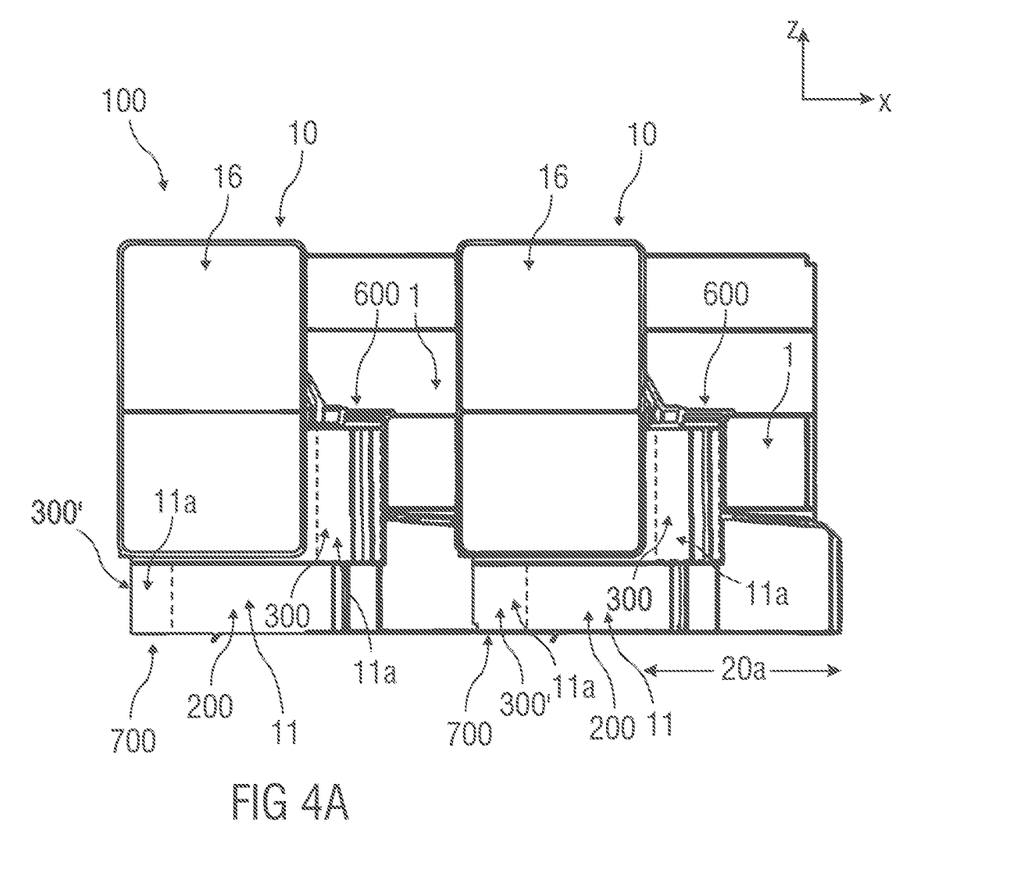
FIGS. 4A to 4C show schematically in side views an embodiment of a passenger seating arrangement comprising two seat units arranged one behind another.
Figure 4B:
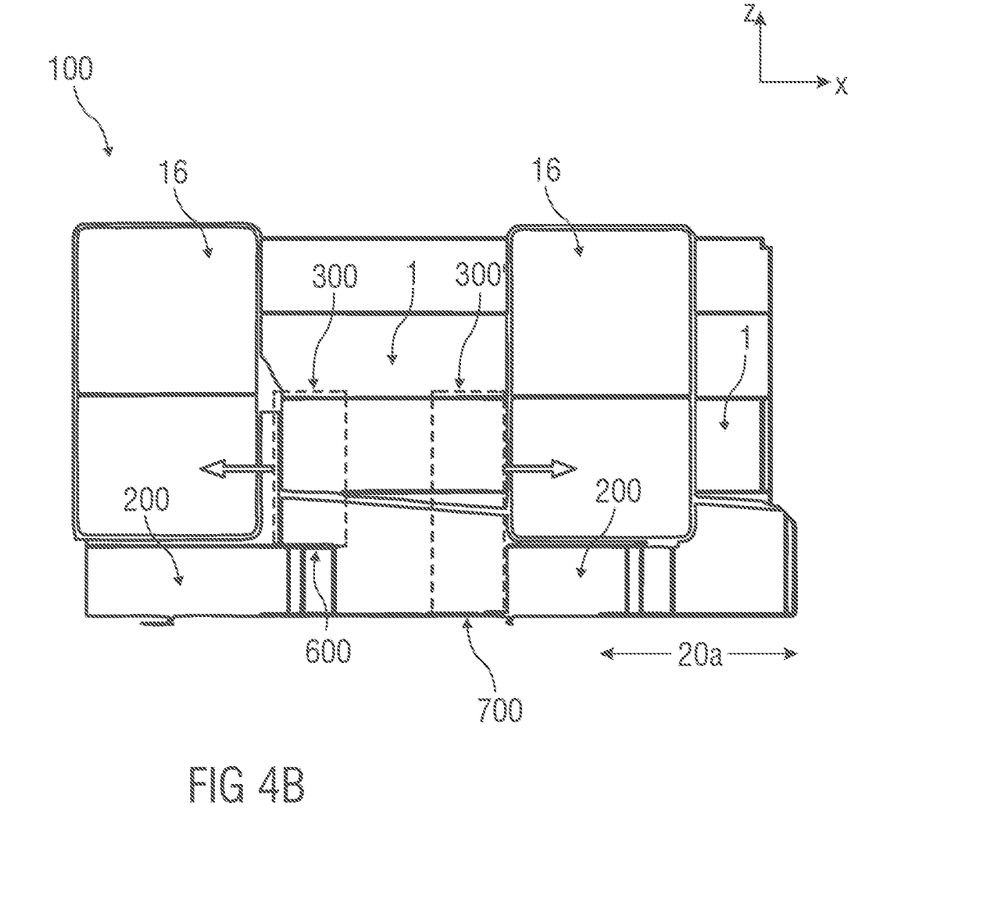
Figure 4C:
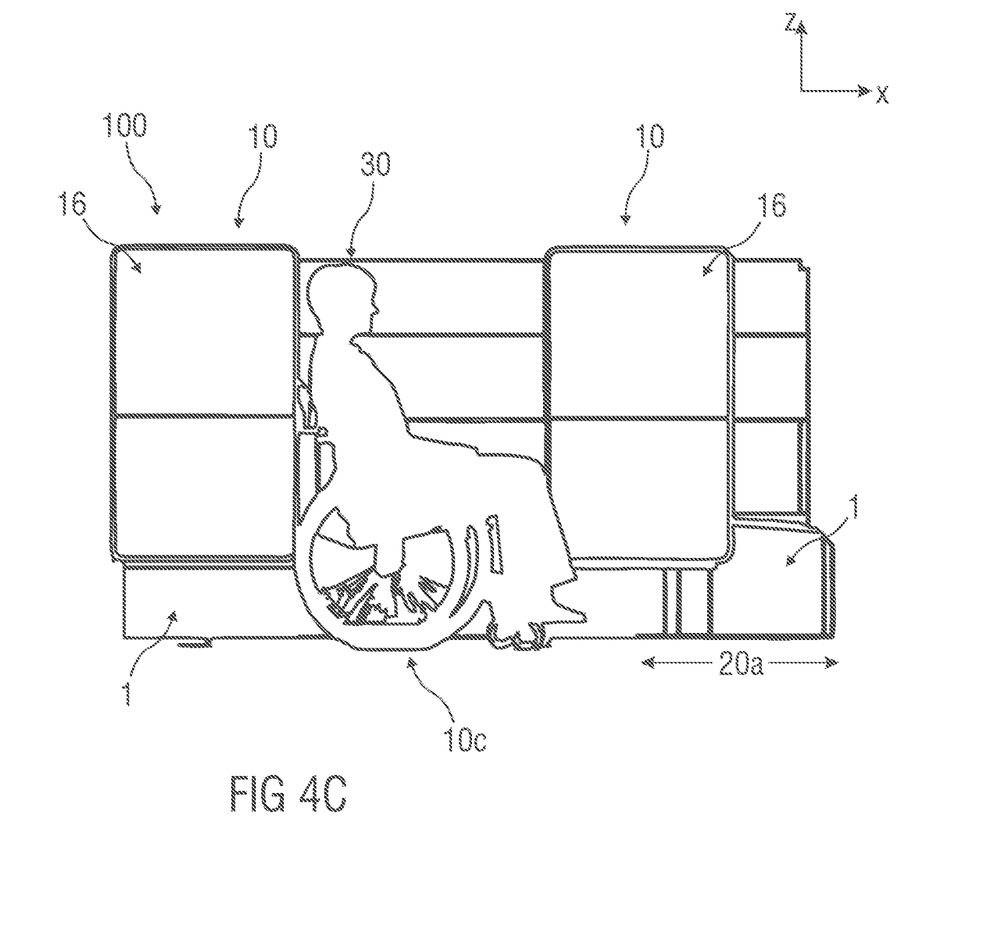

The passenger furniture device 1 is configured to provide different privacy, comfort and utility features to a passenger 30 (shown in FIG. 4C). In particular, the passenger furniture device 1 comprises a substantially box-shaped structure. The passenger furniture device 1 is arranged next to the passenger seat 10*b*.

Figure 3:
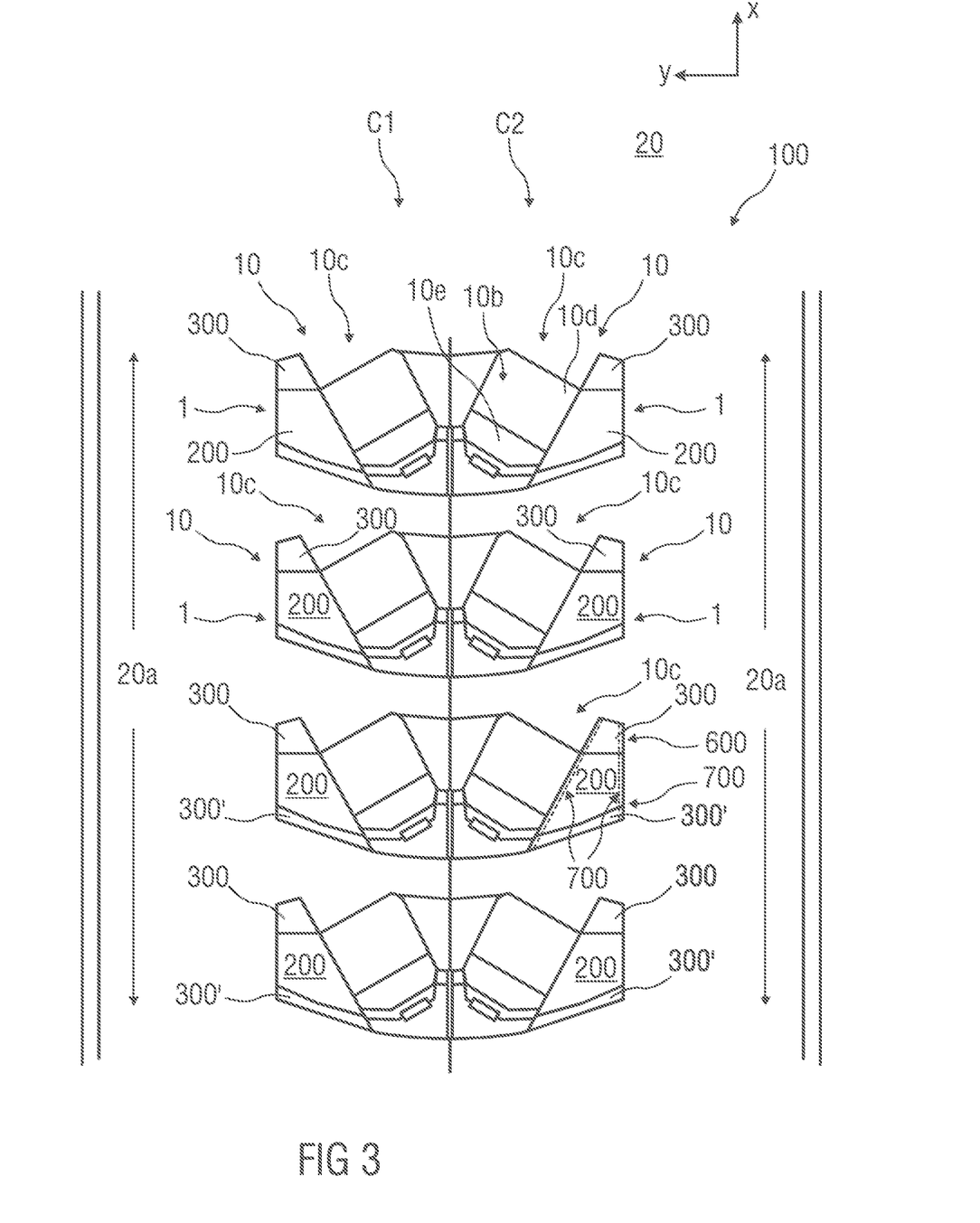
FIG. 3 shows schematically in a top view an embodiment of a passenger seating arrangement comprising a plurality of seat units.

The passenger furniture device 1, from a top view, best shown in FIG. 3, comprises a substantially trapezoidal shape. Optionally, the passenger furniture device 1 may comprise a substantially triangular shape or a substantially square shape.

Figure 2:
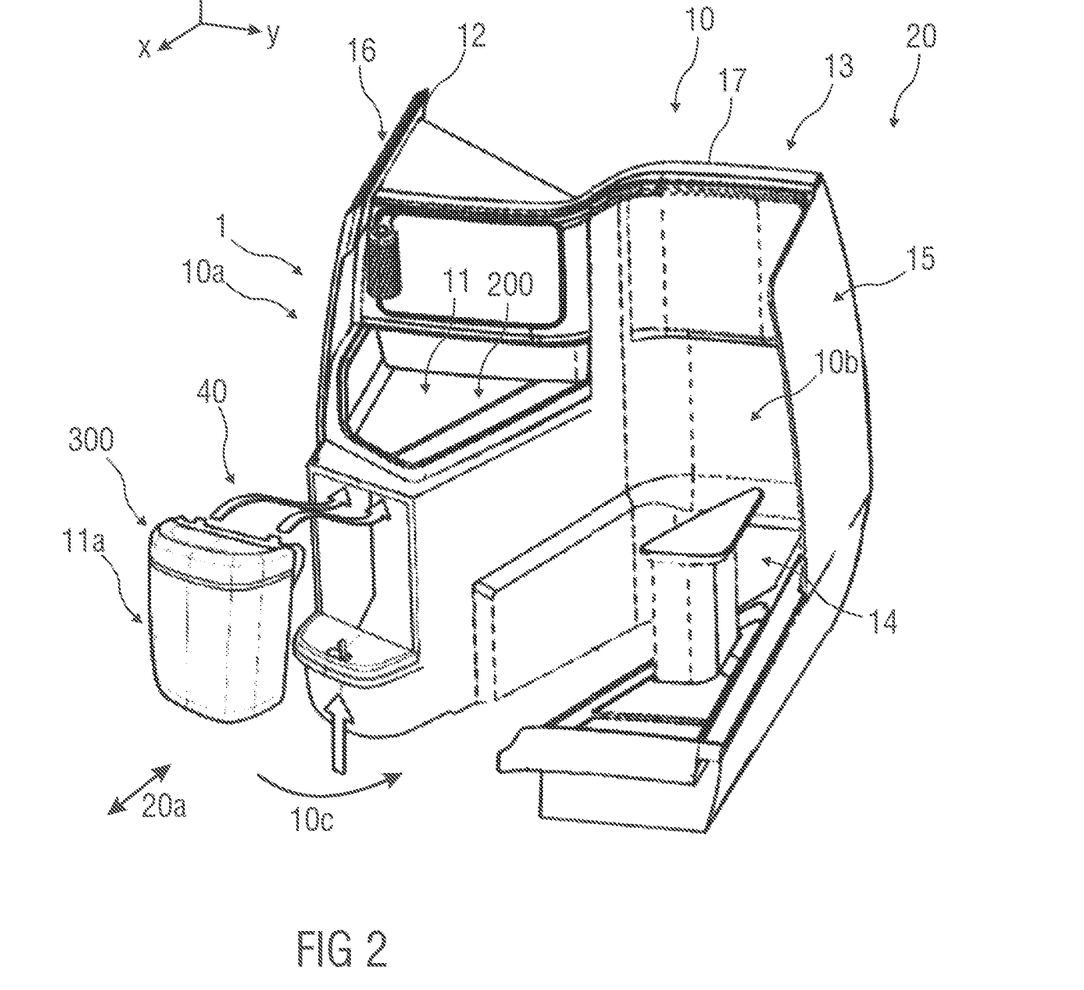
FIG. 2 shows schematically in perspective view an embodiment of a seat unit comprising a passenger seat and a passenger furniture device.

For example, the passenger furniture device 1 and the passenger seat 10*b* are configured as or built together to the seat unit 10, as shown in FIG. 2 in more detail. To access the seat unit 10, in particular to take a seat, the passenger 30 has to pass the passenger furniture device 1. For instance, the passenger furniture device 1 is arranged next to an aisle 20*a* of the vehicle cabin 20.

Further, the passenger furniture device 1 comprises a base element 200 comprising an upper utility surface 201 for use by the passenger 30 seated next to the passenger furniture device 1. The base element 200 further comprises a front side 202, a rear side 203 and two lateral sides 204 connecting the front side 202 and the rear side 203. The lateral sides 204 are configured as side walls. For example, the base element 200 is configured as a console element 11. The base element 200 may comprise a front wall 205 on the front side 202 as shown in FIG. 1A. The base element 200 is arranged on a cabin floor 20*b*. Optionally additionally, the base element 200 is fixed, e.g. via a not further shown screw attachment, to the cabin floor 20*b*.

Furthermore, the passenger furniture device 1 comprises a removable section element 300 which is mounted to one side of the base element 200. For example, the section element 300 is detachably mounted to the front side 202 of the base element 200. The section element 300 may be arranged and mounted to the rear side 203 or lateral side 204 of the base element 200.

For example, the section element 300 comprises an upper utility extending surface 301 configured to extend the upper utility surface 201 of the base element 200 when the section element 300 is mounted to the base element 200. Moreover, the section element 300 is substantially box-shaped and forms together with the base element 200, when mounted to the base element 200, the passenger console 10*a*.

The section element 300 is detachably mounted to the front side 202 of the base element 200. The section element 300 is, for example, a console part 11*a*. Exemplary, the section element 300 is configured as a front nose 600, as marked in FIG. 1B, of the base element 200. The section element 300 comprises a substantially self-contained structure. For example, the section element 300 comprises a hollow space 302 surrounded by a wall structure 303. For example, the hollow inner space 302 is provided underneath the upper utility extending surface 301. Furthermore, the section element 300 may provide a storage compartment, wherein the wall structure 303 may be opened from a passenger's side to gain access to the hollow space 302. A position of an opening 304 is exemplarily indicated by dotted lines. The opening 304 may define a passageway to the hollow inner space 302. The hollow inner space 302 may be used as a storage compartment e.g. for passenger items or specific aircraft devices, such as an airbag or a life vest. The opening 304 may be closed and opened via a not further shown hinged cover.

In the shown example, the section element 300 comprises a front wall 305, a rear wall 306 and two lateral walls 307. The section element 300 further comprises a bottom 308, e.g. a bottom wall. The extending surface 301 is configured as top of the section element 300. For example, the surface 301 of the section element 300 and the surface 201 of the base element 200 are horizontally aligned in a mounted state of the section element 300. For example, the section element 300 is formed from one-piece. Optionally, the section element 300 is configured from multiple pieces. For example, the walls 305 to 307, the bottom 308 and the extending surface 301 are connected to each other via any possible connection and joining technology. In this example, the section element 300 is made of lightweight materials, e.g. synthetic material and/or metal. The shown base element 200 comprises a number of holes 500 provided on at least the front wall 305 and the lateral walls 307. The holes 500 are e.g. cut-outs or through holes. The extending surface 301 can also comprise holes 500. The holes 500 are arranged distanced from each other along a vertical and horizontal extension direction D1, D2 of the section element 300. The holes 500 are, for example, provided to reduce an overall weight of the section element 300.

For example, if two seat units 10 are arranged one behind another, the base element 200 of the seat unit 10, to which the passenger 30 with reduced mobility, also known as PRM, needs access to, comprises the removable section element 300. Further, the base element 200 of the seat unit 10 arranged in front of the seat unit 10 for PRM comprises a removable rear section element 300' configured as a rear panel 700 of the base element 200, as best shown in FIGS. 3, 4A and 4B. When both section elements 300, 300' are removed, an access space of the passenger access 10*c* provided between the two base elements 200 is increased in the rear as well as in the front.

For example, each base element 200 of a respective seat unit 10 comprises two removable section elements 300, 300' as exemplarily shown in FIGS. 3 and 4B. One of the section elements 300 is configured as a front nose 600 and the other one of the section elements 300' is configured as a rear panel 700. For example, the removable section element or elements 300, 300' is/are console part/s 11*a*. The two removable section elements 300, 300' are arranged on opposite sides 202, 203 of the base element 200. It is to be understood that it is also possible to provide removable side panels 700 of the base element 200, as indicated by dotted lines in FIG. 3, for example to provide an enlarged area in a transverse direction of the seat unit 10.

For instance, the passenger furniture device 1, in particular the passenger console, comprises the upper utility surface 201 for a corresponding passenger 30 of the seat unit 10. The utility surface 201 for the corresponding passenger 30 is provided by an upper surface 800 of the base element 200. For example, the base element 200, in particular in a region of the upper utility surface 201, can comprise at least one of a shelf 801, a table-top 802, and not further shown storage space and storage means. Additionally, the base element 200, in particular in a region of the upper utility surface 201, can comprise not further shown service and/or operational elements, such as switches and HMI-panel to control operable features of the seat unit 10.

In a mounted state of the section element 300, as shown in FIGS. 3 and 4A, said section element 300 at least extends a total utility surface 201. Additionally or optionally said section element 300 extends a total side surface 201 in a mounted state, as shown in FIG. 4A in view of FIG. 4B when the section element 300 is removed.

To simply mount and dismount the section element 300 to and from the base element 200 a simple latching mechanism 40 is provided. For example, the latching mechanism 40 comprises a release mechanism 50. The release mechanism 50 may be operated by the service and/or crew member only. The release mechanism 50 may be operated by a specific tool. In particular, the latch mechanism 40 is provided by a simple plug-in and clip device 400. The plug-in and clip device 400 is provided on the base element 200 and the section element 300 such that the section element 300 is detachably mounted to the base element 200.

When fully dismounting the section element 300 from the base element 200 a usable surrounding area of the base element 200 and so as a passenger access 10c space is enlarged.

In other words: An enlargement of a passenger access 10c is enabled by easily dismounting the section element 300 from the base element 200. That means that an easy transfer possibility is obtained for the passenger 30 with disability from the aisle 20a to the seat 10b. Due to the simple plug-in and clip device 400 the dismounting happens quickly and uncomplicated. For example, a service or crew member of an airline can dismount the section element 300 in a few and simple steps to provide more space for transferring the passenger 30 into the seat 10b, for example from a wheelchair or other transfer systems. Afterwards, if requested by the passenger 30, the section element 300 can be easily plugged onto and fixed to the base element 200 via the plug-in and clip device 400.

For example, the base element 200 comprises at least one receiving area 206 for receiving the section element 300. For example, the receiving area 206 is configured as a cut-out like structure. Further, the base element 200 comprises a support foot 207 onto which the section element 300 is arranged and supported in the mounted state. The support foot 207 protrudes from the front side 202 of the base element 200. For instance, the support foot 207 may comprise a not further shown separate storage compartment which is accessible from the seat 10b. For example, a life vest can be stored within the support foot 207. The support foot 207 is not necessary if the section element 300 is configured larger in the vertical extension direction D1 than shown. For example, the section element 300 may comprise the same height than the base element 200.

The plug-in and clip device 400 comprises two plug-in elements 401 and corresponding recesses 402. The plug-in elements 401 are arranged on the section element 300 and the corresponding recesses 402 are arranged on the base element 200. Further, the plug-in and clip device 400 comprises at least one clip element 403 and a corresponding clip engagement portion 404. The clip element 403 is arranged on the base element 200 and the corresponding clip engagement portion 404 is provided on the section element 300. The clip engagement portion 404 is, for example, configured as a not in detailed shown recess or a reception. The clip element 403 is, for example, configured as a hook. The plug-in elements 401 may be hook-shaped. The clip element 403 may be part of the release mechanism 50. For example, the clip element 403 is spring-loaded. By operating the release mechanism 50, e.g. via a specific tool, the clip element 403 is moved in a direction counter to a spring force to release the section element 300.

Moreover, the plug-in elements 401 are configured as positioning and fixing elements, in particular for pre-positioning and pre-fixing of the section element 300 when mounting to the base element 200.

It is to be understood that the rear section element 300' comprises same features, for example the latching mechanism 40, as the front section element 300.

FIG. 1A shows an inner shape and design of the section element 300, wherein the section element 300 is made of a lightweight material such as plastic material. The wall structure 303 is provided with a plurality of holes 500 so as to enable an even more lightweight design of the section element 300.

FIG. 1B shows the section element 300 with a coating or a cover 900 surrounding the inner shape with a substantially porous design of the section element 300. For example, the base element 200, in particular in form of a console element 11, comprises a gripping structure 60. The gripping structure 60 is configured as a handle 60a extending in the vertical extension direction D1. The gripping structure 60 extends substantially perpendicular upwards from the utility surface 201 of the base element 200. By gripping the gripping structure 60 the passenger 30 may aid her- or himself when standing up or sitting down. The handle 60a is substantially O-shaped or U-shaped. The handle 60a comprises at least a through-hole 60b through which fingers of the passenger 30 can be easily inserted for an improved gripping.

FIG. 1C shows an embodiment of the base element 200 with an opened front side 202. For example, the base element 200 comprises a footwell 208 underneath the upper utility surface 201. The footwell 208 provides a leg and footrest 209, such as a cushioned leg and foot support, and/or storage compartments. The section element 300 is therefore configured as a front nose 600 closing the footwell 208 when mounted to the base element 200. Thereby, the hollow space 302 of the section element 300 is configured to enclose a front portion of the footwell 208 when mounted to the base element 200. Therefore, the rear wall 306 of the section element 300 is omitted. The section element 300 comprises an open rear side 309. For example, the footrest 209 is supported on the support foot 207 of the base element 200. When the section element 300 is mounted to the base element 200, the footrest 209 is partially inserted into the hollow space 302 through the open rear side 309.

For example, the base element 200 comprises at least one hollow interior section 210. The hollow interior section 210 provides the footwell 208 for a passenger seated in the rear. The base element 200 comprises at least one not further shown opening arranged on the rear side 203 of the base element 200. A passenger seated behind can pass her or his legs and feet through the opening. The footwell 208 is accessible from the rear side 203.

The base element 200, e.g. configured as a console element 11, comprises at least the footwell 208 for a rear passenger and the utility surface 201 for a corresponding passenger 30 of the seat unit 10. For instance, an adjustable passenger seat 10b can be brought into a sleeping position, in particular a bed position, such that the seat 10b is partially extending and projecting into the footwell 208. Further, the base element 200 can comprise the footrest 209 which is fixed inside the footwell 208. When the seat 10b is brought into the sleeping position, the seat 10b, e.g. a leg-rest or a seat pan 10d, shown in FIG. 3, comes into contact with the footrest 209 such that a sleeping surface is extended for the rear passenger. The footrest 209 has a shape corresponding with a shape of the leg-rest or the seat pan 10d. Shape and sizes of the footrest 209 are configured to fit into the base element 200 and may vary depending on a shape of the base element 200.

For example, the seat 10b can be brought into one or more common positions, e.g. into a taxi, take-off, landing position, designated as "TTL" or "TT&L"-position, an inclined position or a sleeping position. Particularly, in the sleeping position the seat pan 10d, a backrest 10e and optionally the leg-rest are brought into a substantially flat, horizontal position.

The plug-in and clip device 400 comprises at least three plug-in elements and corresponding recesses. For example, a number of plug-in elements 501 are arranged on the base element 200. A number of plug-in elements 401 are arranged on the removable section element 300. Corresponding recesses 402 are arranged on both, the base element 200 and the section element 300. Further, the plug-in and clip device 400 comprises at least one clip element 403, which cannot be seen in perspective view according to FIG. 1C, and a corresponding clip engagement portion 404. The clip element 403 is arranged on the section element 300 and the corresponding clip engagement portion 404 is provided on the base element 200. The release mechanism 50 may be provided in an area of the support foot 207 of the base element 200. For example, the release mechanism 50 is coupled to the clip engagement portion 404. Upon operation of the release mechanism 50, the clip engagement portion 404 is configured to release the clip element 403 from the clip engagement portion 404. The plug-in elements 401 and 501 may be hook-shaped. The clip element 403 may be part of the release mechanism 50.

Moreover, the plug-in elements 401 and 501 are configured as positioning and fixing elements, in particular for pre-positioning and pre-fixing of the section element 300 when mounting to the base element 200.

The passenger furniture device 1 and console 10a comprises a partition wall 12 arranged adjacent a lateral side 204 of the base element 200. The partition wall 12 improves privacy to the passenger 30. The partition wall 12 may be attached fixedly to the lateral side 204 of the base element 200. The partition wall 12 comprises, for example, the gripping structure 60. The gripping structure 60 is configured as a handle 60a extending substantially perpendicular horizontally from the partition wall 12 in a direction toward the base element 200. By gripping the gripping structure 60 the passenger 30 may aid her- or himself when standing up or sitting down. The handle 60a is substantially O-shaped or U-shaped. The handle 60a comprises at least a through-hole 60b through which fingers of the passenger 30 can be easily inserted for an improved gripping.

FIG. 2 shows schematically in perspective view an embodiment of a seat unit 10 comprising a passenger seat 10b and a passenger furniture device 1. The passenger furniture device 1 can be connected to several furniture components, such as a seat shell structure 13, an armrest structure 14, a privacy divider 15 and a movable door structure 16. The shell structure 13 can comprise at least the partition wall 12 arranged bordering the aisle 20a of the vehicle cabin 20 and a rear partition wall 17 separating seat units 10 arranged one behind another in a same column C1, C2, as shown in FIG. 3. The door structure 16 is movable guided on the partition wall 17. The door structure 16 may be moved to close or open the passenger access 10c.

FIG. 3 shows schematically in a top view an embodiment of a passenger seating arrangement 100 comprising a plurality of seat units 10 for a vehicle cabin 20, in particular an aircraft cabin. The seat units 10 in one column C1, C2 are arranged on behind another and each seat unit 10 comprises a side bordering an aisle 20a of the vehicle cabin 20. The seat units 10 are distanced from each other by a pitch providing a direct passenger access 10c to each seat unit 10 from the aisle 20a. Further, the passenger furniture device 1 is configured as a console 10a and which is arranged alongside the aisle 20a and adjacent to the passenger seat 10b. In a mounted state of the front section element 300 and/or the rear section element 300', said section element/s 300, 300' extend/s a utility surface 201 of the base element 200. In a dismounted state of the front section element 300 and/or the rear section element 300', the direct passenger access 10c to the corresponding seat unit 10 is enlarged.

For example, the shown passenger seating arrangement 100 is a herringbone seating layout with a plurality of seat units 10 providing angled seats 10b, in particular outwardly facing seats 10b with respect to the aisle 20a.

For example, the column C1, C2 is provided with a number of same seat units 10 arranged one behind another. For example, the column C1, C2 may comprise a first number of not further shown first seat units and a second number of second seat units 10 arranged behind the last seat unit of the number of first seat units. The first seat units may be configured as forward facing seat units and the second seat units 10 may be configured as angled seat units 10. The forward facing seat unit comprises a not further shown seat with a longitudinal extension direction running substantially parallel to a longitudinal axis of the aircraft cabin 20. The angled seat unit 10 comprises a seat with a longitudinal extension direction being substantially angled relative to the longitudinal axis of the aircraft cabin 20.

The seats and the corresponding passenger furniture devices 1 of the forward facing seat units are arranged in a staggered manner when several forward facing seat units are arranged behind another. For example, an aisle seat of a front forward facing seat unit is followed by an aisle passenger furniture device 1 of a rear forward facing seat unit etc. That means in particular, that the forward facing seat units are arranged alternating behind each other. This allows same seat unit features provided to each passenger.

When several angled seat units 10 as best shown in FIG. 3 are arranged one behind another, the seats 10b are arranged one behind another and the passenger furniture devices 1 are arranged one behind another. That means, several angled seat units 10 are identically arranged behind each other, wherein the seats 10b of the angled seat units 10 are identically angled. This ensures alignment of each front footwell 208 with each rear seat 10b of the angled seat units 10.

The angled seat units 10 may comprise two different configurations, an outwardly angled seat configuration and an inwardly angled seat configuration. Each of the mentioned configurations depends on an orientation of the seat 10b with respect to the aisle 20a. For example, each of the configurations comprise a seat 10b positioned at an angle of about 30° to 50°, preferably 45°, with respect to the aisle 20a. For example, the inwardly angled seat 10b can be positioned within the angled seat unit at an angle of about 30° to 50°, preferably 45°, facing towards the aisle 20a. The outwardly angled seat 10b can be positioned within the angled seat unit 10 at an angle of about 30° to 50°, preferably 45°, facing away from the aisle 20a. It is understood that the seat 10b which is angled relative to the longitudinal axis of the vehicle cabin 20 is substantially facing a forward direction of the vehicle cabin 20. Nevertheless, it is possible to arrange all the seat units 10 facing a rearward direction of the vehicle cabin 20. In addition, by arranging several identically angled seat units 10 behind each other in the same column C1, C2 a so-called herringbone passenger seating arrangement or herringbone seating configuration can be achieved.

In case of an inwardly angled seat units 10, the corresponding passenger furniture device 1, that means the respective base element 200 comprises the at least one removable section element 300, 300'. In case of forward facing seat units arranged one behind another, each passenger furniture device 1 arranged adjacent to the aisle 20a comprises at least one removable section element 300, 300'.

FIGS. 4A to 4C show schematically in side views an embodiment of a passenger seating arrangement 100 comprising two seat units 10 arranged one behind another. In particular, FIG. 4A shows passenger furniture devices 1, wherein each front section element 300 is mounted to the corresponding base element 200. Further, each rear section element 300' is mounted to the base element 200. FIG. 4B shows dismounted section elements 300, 300', wherein the section element 300 of the rear seat unit 10 is configured as a front nose 600 of the corresponding base element 200 and the section element 300' of the front seat unit 10 is configured as a rear panel 700 of the corresponding base element 200. The door structures 16 of the corresponding seat unit 10 are moved in a direction away from the passenger access 10c. FIG. 4C shows the enlarged passenger access 10c for the passenger 30 with disability ensuring easy transfer possibility of the passenger 30 to the seat 10b.

With reference now to FIG. 5, the apparatus 1100 is provided. As shown in FIG. 5, an example of the apparatus 1100 is a flying apparatus 1101, such as an aerospace vehicle, aircraft, air cargo, flying car, satellite, planetary probe, deep space probe, solar probe, and the like. As also shown in FIG. 5, a further example of the apparatus 1100 is a ground transportation apparatus 1102, such as an automobile, a truck, heavy equipment, construction equipment, a boat, a ship, a submarine, and the like. A further example of the apparatus 1100 shown in FIG. 5 is a modular apparatus 1103 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

Figure 6:
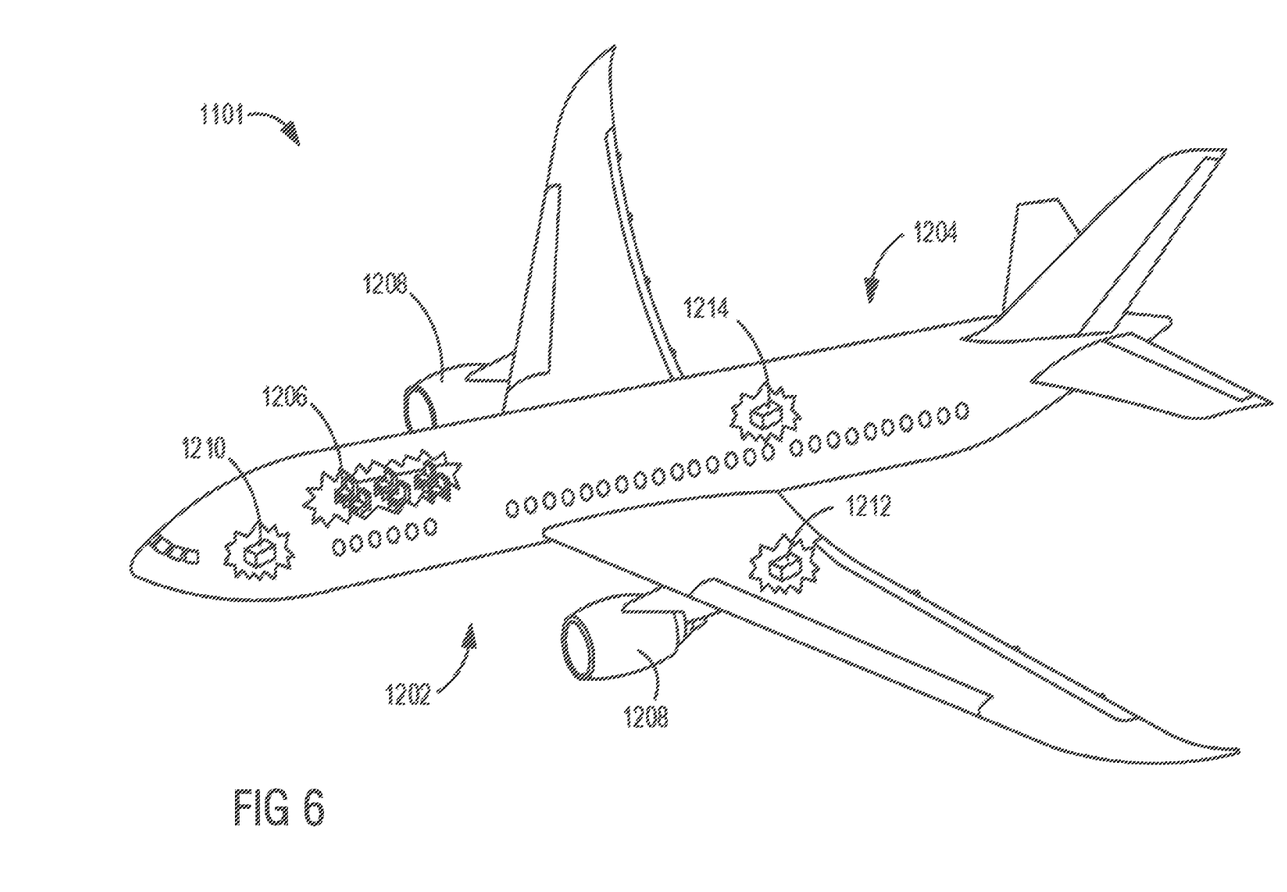
FIG. 6 is a perspective view of an aircraft in accordance with an example.

With reference now to FIG. 6, a more specific diagram of the flying apparatus 1101 is depicted in which an implementation of the disclosure is advantageously employed. In this example, the flying apparatus 1101 is an aircraft produced by an apparatus manufacturing and service method and includes an airframe 1202 with a plurality of systems 1204 and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries, such as the automotive industry, etc.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Further, the disclosure comprises embodiments according to the following clauses:

Clause 1. A passenger furniture device for a passenger seat provided within a vehicle cabin, the passenger furniture device comprising:
a base element having an upper utility surface;
a removable section element; and
a latch mechanism provided on the base element and the section element such that the section element is detachably mounted to the base element via the latch mechanism.

Clause 2. The passenger furniture device according to clause 1, wherein the section element is detachably mounted to one side of the base element.

Clause 3. The passenger furniture device according to clause 1, wherein the section element is configured as one of a front nose, a rear panel or side panel of the base element.

Clause 4. The passenger furniture device according to clause 1, wherein the base element comprises at least two removable section elements arranged on opposite sides of the base element.

Clause 5. The passenger furniture device according to clause 1, wherein the base element comprises at least one receiving area for receiving the section element.

Clause 6. The passenger furniture device according to clause 1, wherein the base element comprises a support foot onto which the section element is supported on in the mounted state of the section element.

Clause 7. The passenger furniture device according to clause 1, wherein in a mounted state of the section element said section element at least extends a total utility surface and/or side surface of the base element.

Clause 8. The passenger furniture device according to clause 1, wherein the base element is configured as a console element.

Clause 9. The passenger furniture device according to clause 1, wherein the section element is configured as a console part.

Clause 10. The passenger furniture device according to clause 1, wherein the latch mechanism comprises at least one plug-in element and a corresponding recess.

Clause 11. The passenger furniture device according to clause 10, wherein the plug-in element is arranged on the section element and the corresponding recess is arranged on the base element and/or vice versa.

Clause 12. The passenger furniture device according to clause 1, wherein the latch mechanism comprises at least one clip element and a corresponding clip engagement portion.

Clause 13. The passenger furniture device according to clause 12, wherein the clip element is arranged on the base element and the corresponding clip engagement portion is arranged on the section element and/or vice versa.

Clause 14. The passenger furniture device according to clause 10, wherein the plug-in element is configured as a positioning and fixing element for pre-positioning and pre-fixing of the section element when mounting to the base element.

Clause 15. The passenger furniture device according to clause 1, wherein the base element comprises at least one hollow interior section providing a footwell for a passenger seated behind.

Clause 16. A seat unit for an aircraft cabin comprising:
a passenger furniture device having:
  a base element having an upper utility surface;
  a removable section element; and
  a latch mechanism provided on the base element and the section element such that the section element is detachably mounted to the base element via the latch mechanism; and
a passenger seat situated laterally adjacent to the passenger furniture device.

Clause 17. The seat unit according to clause 16, wherein the seat unit is distanced from an adjacent unit and is configured to provide an access from an aisle.

Clause 18. The seat unit according to clause 16, wherein the passenger furniture device is configured as a console and is arranged alongside an aisle and adjacent to the passenger seat.

Clause 19. The seat unit according to clause 16, wherein the section element extends a utility surface of the base element in a mounted state and provides a passenger access to the seat unit in a dismounted state.

Clause 20. A passenger seating arrangement for an aircraft cabin comprising a plurality of seat units each comprising:
a passenger furniture device having:
a base element having an upper utility surface;
a removable section element; and
a latch mechanism provided on the base element and the section element such that the section element is detachably mounted to the base element via the latch mechanism; and
a passenger seat situated laterally adjacent to the passenger furniture device,
wherein seat units in one column are arranged on behind another and/or in staggered manner, and each seat unit comprises a side bordering an aisle of the vehicle cabin The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An aircraft seat unit for an aircraft cabin, the aircraft seat unit comprising:
  a base element having an upper utility surface, the base element being configured as a console element connected to a seat shell structure of the aircraft seat unit and arranged alongside an aisle of the aircraft cabin;
  a passenger seat laterally adjacent to the console element for access from the aisle of the aircraft cabin via a passenger access space, the aircraft seat unit being distanced from an adjacent aircraft seat unit by the passenger access space;
  a removable section element having a wall structure defining a hollow space, the wall structure being detachably mounted to the base element via a latch mechanism that separates the removable section element from the base element to increase the passenger access space, the removable section element having an upper utility extending surface configured to extend the upper utility surface when the removable section element is mounted to the base element; and
  a removable panel detachably mounted to the base element, the removable section element and the removable panel arranged on opposites sides of the base element.

2. The aircraft seat unit of claim 1, wherein the hollow space comprises a storage compartment.

3. The aircraft seat unit of claim 2, wherein the wall structure is configured to be opened to gain access to the storage compartment.

4. The aircraft seat unit of claim 1, wherein the base element comprises at least one receiving area for receiving the removable section element.

5. The aircraft seat unit of claim 4, wherein the base element comprises a support foot which protrudes from a front side of the base element and upon which the removable section element is arranged and supported.

6. The aircraft seat unit of claim 1, wherein the hollow space is provided underneath the upper utility surface of the base element.

7. The aircraft seat unit of claim 1, wherein removal of an adjacent removable panel detachably mounted to the adjacent aircraft seat unit increases the passenger access space.

8. The aircraft seat unit of claim 1, wherein the wall structure comprises a plurality of holes.

9. A passenger seating arrangement for an aircraft cabin, the passenger seating arrangement comprising:
  an aircraft seat unit that comprises:
    a base element having an upper utility surface, the base element being configured as a console element connected to a seat shell structure of the aircraft seat unit and arranged alongside an aisle of the aircraft cabin;
    a passenger seat laterally adjacent to the console element for access from the aisle of the aircraft cabin via a passenger access space, the aircraft seat unit being distanced from an adjacent aircraft seat unit by the passenger access space;
    a removable section element having a wall structure defining a hollow space, the wall structure being detachably mounted to the console element via a latch mechanism that separates the removable section element from the base element to increase the passenger access space, the removable section element having an upper utility extending surface configured to extend the upper utility surface when the removable section element is mounted to the base element; and
    a removable panel detachably mounted to the base element, the removable section element and the removable panel arranged on opposites sides of the base element.

10. The passenger seating arrangement of claim 9, wherein the hollow space comprises a storage compartment.

11. The passenger seating arrangement of claim 10, wherein the wall structure is configured to be opened to gain access to the storage compartment.

12. The passenger seating arrangement of claim 9, wherein the base element comprises at least one receiving area for receiving the removable section element.

13. The passenger seating arrangement of claim 12, wherein the base element comprises a support foot which protrudes from a front side of the base element and upon which the removable section element is arranged and supported.

14. The passenger seating arrangement of claim 9, wherein the hollow space is provided underneath the upper utility surface of the base element.

15. The aircraft seat unit of claim 9, wherein removal of an adjacent removable panel detachably mounted to the adjacent aircraft seat unit increases the passenger access space.

16. The aircraft seat unit of claim 9, wherein the wall structure comprises a plurality of holes.

17. A passenger furniture device for an aircraft cabin, the passenger furniture device comprising:
- a base element having an upper utility surface, the base element being configured as a console element connected to a seat shell structure of an aircraft seat unit provided within the aircraft cabin, the base element arranged laterally adjacent the aircraft seat unit and alongside an aisle of the aircraft cabin, the base element comprising at least one receiving area and a support foot which protrudes from a front side of the base element and upon which a removable section element is arranged and supported; and
- the removable section element received on the at least one receiving area for support by the support foot, the removable section element having a wall structure defining a hollow space, the wall structure being detachably mounted to the console element via a latch mechanism that separates the removable section element from the base element to increase a passenger access space between the aircraft seat unit and an adjacent aircraft seat unit, the removable section element having an upper utility extending surface configured to extend the upper utility surface when the removable section element is mounted to the base element; and
- a removable panel detachably mounted to the base element, the removable section element and the removable panel arranged on opposites sides of the base element.

18. The passenger furniture device of claim 17, wherein the hollow space comprises a storage compartment.

19. The passenger furniture device of claim 18, wherein the wall structure is configured to be opened to gain access to the storage compartment.

20. The passenger furniture device of claim 17, wherein the hollow space is provided underneath the upper utility surface of the base element.

\* \* \* \* \*